Figure 3:
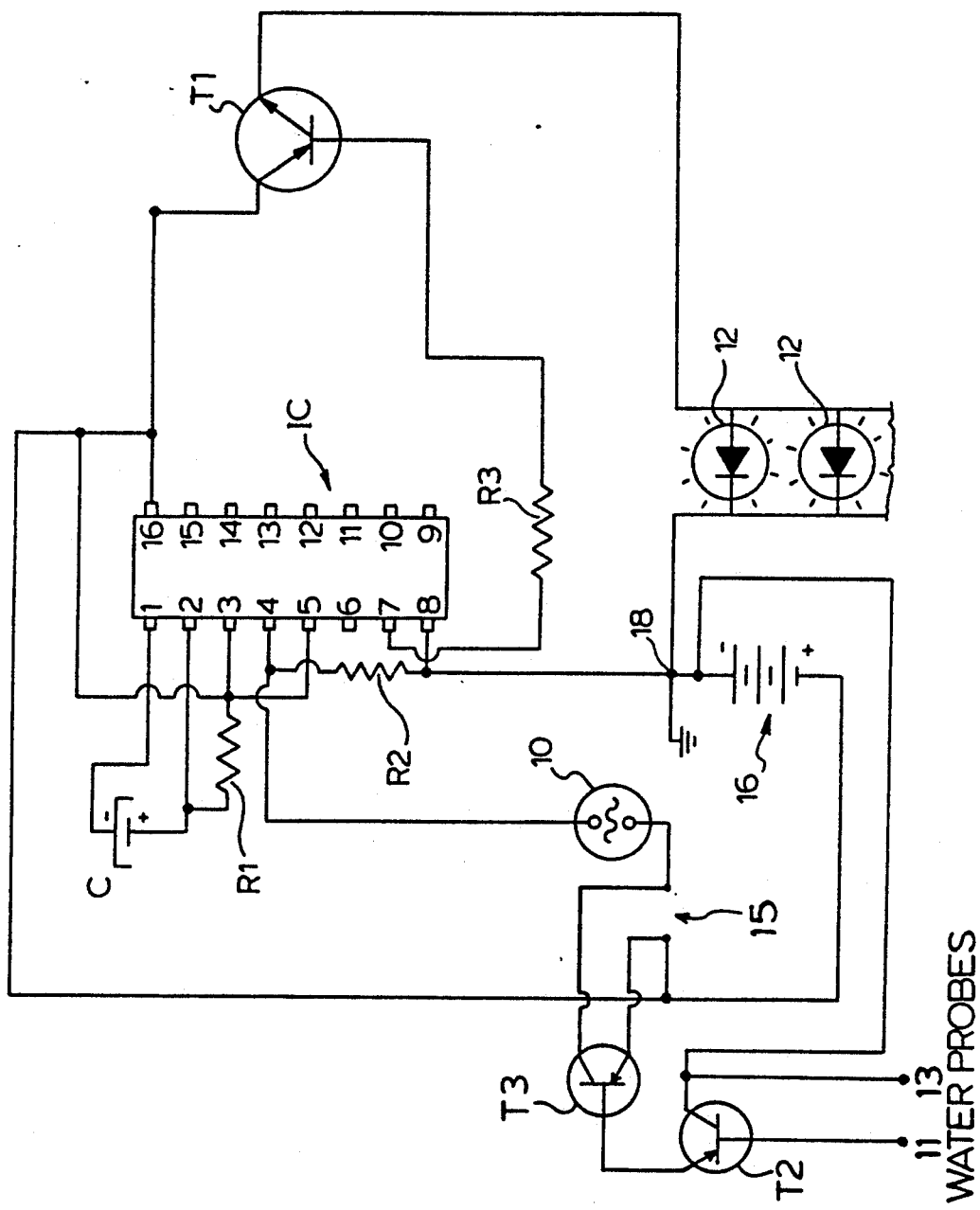

United States Patent [19]
Rodgers

[11] Patent Number: 5,330,282
[45] Date of Patent: Jul. 19, 1994

[54] FISHING LURE

[76] Inventor: Nicholas A. Rodgers, 15 Blair Lane, R.R. #1, Perkinsfield, Ontario, Canada, LOL 2VO

[21] Appl. No.: 72,390
[22] Filed: Jun. 7, 1993
[51] Int. Cl.⁵ .............................. A01K 85/01
[52] U.S. Cl. .................................... 43/17.6
[58] Field of Search ........................... 43/17.6

[56] References Cited

U.S. PATENT DOCUMENTS

| | | | |
|---|---|---|---|
| 2,897,623 | 8/1959 | Flournoy | 43/17.6 |
| 3,001,315 | 9/1961 | Zimmerman | 43/17.6 |
| 3,535,812 | 10/1970 | Crecelius | 43/17.6 |
| 3,940,868 | 3/1976 | Northcutt | 43/17.6 |
| 4,114,305 | 9/1978 | Wohlert | 43/17.6 |
| 4,227,331 | 10/1980 | Ursey | 43/17.6 |
| 4,347,681 | 9/1982 | Fima | 43/17.6 |
| 4,426,803 | 1/1984 | Helling | 43/17.6 |
| 5,159,773 | 11/1992 | Gentry | 43/17.6 |
| 5,175,951 | 1/1993 | Fruchey | 43/17.6 |

FOREIGN PATENT DOCUMENTS 0759073 9/1980 U.S.S.R. ..................... 43/17.6

Primary Examiner—Kurt C. Rowan

[57] ABSTRACT

A fishing lure contains a light source which is turned on by the OFF to ON transition of a switch. Timing means will turn the light off at the end of an interval following the OFF to ON transition. Preferably a sensor only allows the light being turned on by an OFF to ON transition when the lure is submerged in water.

4 Claims, 2 Drawing Sheets

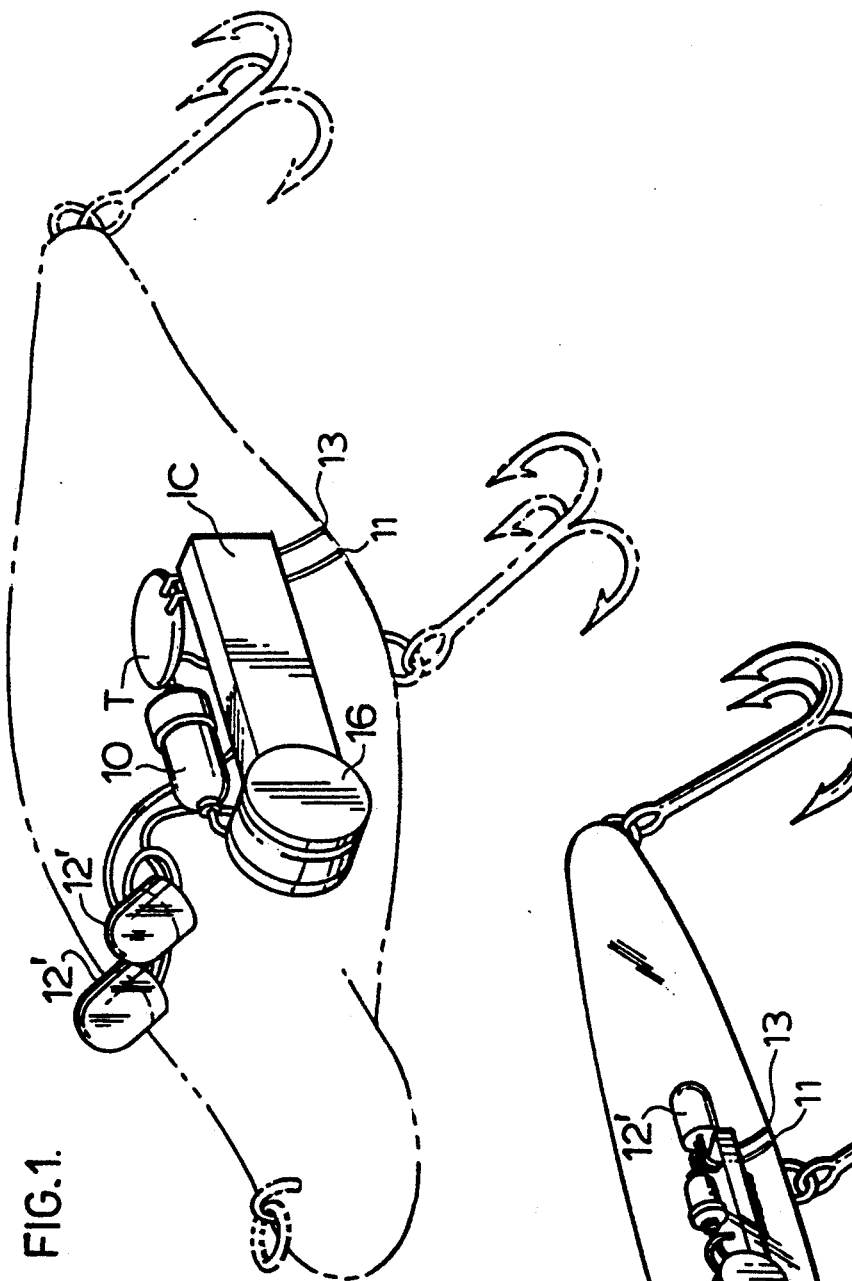

FISHING LURE

This invention relates to the provision of an intermittently illuminated fishing lure.

While most of the contemplated uses of my invention contemplate a fishing lure which is used in trolling or casting or jogged up and down, the invention also extends to any stationary device which is associated with the hook or bait during ice fishing which normally remains stationary until agitated by a fish. Thus the term lure as used extends to such stationary device and may simply comprise a light and the apparatus claimed in association with a hook or net without added shaping or styling.

It is believed and established in practice that a light on a fishing lure tends to attract fish and increase the possibility of a catch. Heretofore it is believed that there has not been provided a lure where a light will flash irregularly to attract the fish whereby more fish will be attracted than with a continuous light.

It is an object of this invention to provide a fishing lure, suitable for fresh water or deep sea fishing, wherein a light source is mounted thereon selectively connected with a power source and having motion responsive means designed to switch said light source between ON and OFF in response to motion of the lure in the water. The ON intervals and the flashing serve to attract the fish to lure when being trolled or otherwise agitated. In ice fishing with the lure sitting still in the water, the light appearing as a result of lure movement may serve to alert the fishermen that a fish is near the hook.

It is noted that within the scope of the invention, a timing circuit, (preferably an integrated circuit) may be used to control illumination duration start or stop times when illumination is called for by the motion responsive means. In a preferred embodiment a timing circuit (whether integrated or otherwise) is provided designed to limit the illumination to a set period after the switch has gone ON. This feature is of particular advantage where the switch is turned on by the attitude of the lure (as, for example by a mercury switch). The timing curcuit, designed to limit illumination duration will, thus prevent loss of battery power if the lure is stored in an attitude which would maintain switch closure for an extended period.

Thus with this aspect of the invention, the light cannot be on continuously but only for a predetermined interval after the switch goes to ON state. The battery life is thus prolonged and an exciting flashing effect is produced.

The motion-actuated ON state provided by this invention provides a higher attraction to the fish than previous systems. U.S. Pat. Nos. to Ray 4,175,348 and Garr 4,888,905 disclose circuits where an oscillator flashes a light on a fishing lure on and off in accord with a predetermined pattern. The fish will become conscious of such a pattern and will thereafter tend to ignore the lure. This is not only true of lures in suspended in the water but is also true of fishing with lures where the lure customarily rests on the sea or lake bottom. With the Ray or Garr circuits the pattern of lighting appears unnatural in a lure resting on the bottom. The appearance is more natural with applicants invention where the bottom-resting lure only flashes when it is jerked.

In its timing and circuitry aspects this invention will be found to use many of the circuit features discussed in my U.S. Pat. No. 4,848,009 dated Jul. 18, 1989.

It is an object of a preferred aspect of the invention to provide the fishing lure in which the light source is a light emitting diode (LED).

The use of the LED's produces a bright display in selected colors which requires much less energy than would the use of incandescent illumination, thus giving longer battery life. Since LED's require less power than other sources, (e.g. incandescent lights), battery and other components may be of smaller size and cost. Such smaller size is of considerable importance in a fishing lure. LED's also provide a relatively high intensity relative to their power requirements.

With regard to both aspects of the invention, it is noted that glass fibre may be used, if desired, to conduct light from the light source to the exterior of the lure. In some cases glass fibres may be undersirable because they have a relatively narrow beam.

There are many alternatives available for the motion responsive means used with the invention to switch the light source on and off, it has been found that for ruggedness, operation and compactness that a mercury switch is preferred. In one aspect of the invention the circuitry only allows the light source to be illuminated on change of the switch to ON state and terminates the illumination after a predetermined period after the switch changes state from OFF to ON.

In a preferred embodiment of the invention, the circuitry is designed to include a pair of probes exposed to the outside of the lure which act as sensors to determine whether the probes (and hence the lure) are immersed as water or not. The circuitry is designed so that when there is a conducting path between the probes, caused by the immersion in water, the light source is illuminated or not responsive to the OFF to ON transition of the motion responsive switch. However in the absence of a conducting path between the probes, such as when the probes are in air, the light source will not be illuminated whether or not the motion responsive switch effects an OFF to ON transition.

Thus in the preferred embodiment last described, the light source will only be illuminated:

(a) within a timed interval after the last OFF to ON transition of the mercury switch which transition has taken place with the probes immersed in water (or in much less likely possibility that the probes become conducting when the switch is ON). Thus the chances for dissipation of battery power are minimized to allow extended battery life. Battery life may thus be extended to a degree that the battery will outlive the attractiveness or availability of the lure to its owner. Hence the battery and circuitry may be completely enclosed in plastic subject only to exposure of the probe ends to ambient water and the light source to exterior visibility. Such encapsulation as protection against ambient water is material to extending the lure life and particularly the life of its circuitry.

In contrast to applicant's encapsulation feature, U.S. Pat. Nos. 4,888,905 Garr and 4,811,513 Groble show circuits wherein the batteries require replacement. Indeed, the latter requires removal of the battery to turn the device off. As these activities would likely be carried out in a fishing environment, contamination of the battery or chamber with water would result in corrosion rendering the device inoperative. Further, fishing lures are subject to extremely rough handling which can distress sealing surfaces, allowing water leakage to the interior of the lure.

A sensor for the detection of a water environment about a fishing lure is disclosed in U.S. Pat. No. 4,227,331 dated 14 OCT 80, to Ursey, et al.

In drawings which illustrate preferred embodiments of the invention:

FIG. 1 is a perspective view of one embodiment of a fishing lure in accord with the invention, FIG. 2 is a perspective view of an alternate embodiment of a fishing lure in accord with the invention, FIG. 3 shows, schematically, an electrical circuit for use with the lure of FIG. 1 or 2, and In FIG. 1 is shown a mercury switch 10, two LED's (not shown) in lenses 12', battery or battery pack 16, integrated circuit IC and a transistor T. Probes 11 and 13, exposed at the surface of the lure body are connected as hereinafter described to detect a water environment surrounding the lure. These are connected as shown in FIG. 3. Preferably the battery 16, switch 10 transistor T, their connecting wires, the lines to the exposed ends of probes 11 and 13, and connecting wires to the LED's 12 are molded into the lure body which is preferably of molded plastic. If desired the lure may be designed so that the battery may be replaced but this will not usually be considered economical since the preferred circuit tends to extend battery life beyond the time when the user tires of or loses the lure. In the embodiment of FIG. 1 the LED's are mounted exterior to the lure body. The switch is preferably mercury and will in some altitudes be in OFF state and in ON state in others. However it will obviously move between OFF and ON states when the lure is agitated.

Encapsulation of the lure may thus cover the body-adjacent ends of the transparent LED lenses 12' (leaving light from the LED's visible exterior to the lure through the exposed portion of the lenses). Encapsulation of the lure will leave exposed to ambient water or air the probe ends 11 and 13.

In alternative forms of the lure in FIG. 2 all elements, including LED 12 and lens 12' are located inside the lure body and may be moulded therein. In the alternative of FIG. 2 the plastic forming the light path between the LED lens 12' and the outside of the lure will be made transparent or translucent, so that the light from an on LED is transmitted to be visible by the fish. Thus the entire device of Figure two may be encapsulated in plastic, subject only to allow a conducting path for ambient water to the ends of probes 11 and 13, and an optical path to the exterior for light from the LED's.

The preferred circuitry for the lures of FIGS. 1 and 2 is shown in FIG. 3.

FIG. 3 shows circuitry including an integrated circuit used to time illumination of LED's 12. It will be understood that switch 10, battery 16, LED's 12 in lenses 12' maybe located as indicated in FIGS. 1 or 2. The integrated circuit IC, transistor T1, T2, and T3 and the remainder of the elements shown in FIG. 3 are encapsulated in the material of the lure, preferably adjacent mercury switch 10.

Preferred values for the circuit elements are as follows:

IC—INTEGRATED CIRCUIT #RR8503 MC14528
T1—TRANSISTOR #2N3906
T2—TRANSISTOR #2N3906
T3—TRANSISTOR #2N3906
C—CAPACITOR 0.47 uF at 30 V
10—BATTERY 3 V
12—LIGHT SOURCE (LED)
16—ACTIVATION SWITCH (MERCURY) MECHANICAL OR PIEZOTRONIC
R1—RESISTOR 1 MEGOHM ¼w
R2—RESISTOR 1 MEGOHM ¼w
R3—RESISTOR 1 MEGOHM ¼w (A mechanical or a piezotronic switch may be used as an alternative to mercury switch 10).

(The integrated circuit and transistor referred to above are both available from Motorola Canada Limited, 3125 Steeles Avenue East, North York, Ontario, Canada).

In operation, with the lure stationary, if the mercury switch is OFF in the stationary attitude of the lure, the switch 10 will be open and the circuit quiescent but capacitor C will be charged to the value of battery 16 (here 3 V). Pin 4 of the integrated circuit will be held at 0 volts which is the voltage arbitrarily designated at node 18. The integrated circuit IC will be in reset condition having the effect that there will be a positive voltage at pin 7, rendering the transistor T non-conducting and maintaining LED's 12 off. With the lure stationary, if the mercury switch is ON the circuit will after a momentary flash of the LED have been returned to the reset or switch OFF condition, as hereafter described and the LED(s) will be off.

In series with the mercury switch 10 there is provided a closable gap 15 in the switch 10 connection to the positive end of battery 16, controlled by probes 11 and 13 and transistors T2 and T3 connected as shown. If probes 11 and 13 are in an air environment, there is no conduction path there between and hence there is no bias on the base of T2 which is therefore non-conducting rendering T3 non-conducting. Gap 15 thus acts as an open circuit and while such open circuit persists, the circuitry cannot be activated by an OFF to ON transition of switch 10. Thus LED's cannot be lit by such OFF to ON transition when probes 11 to 13 are in air. This prevents the expenditure of battery energy when the lure is not in the water.

On the other hand when probes 11 and 13 are immersed in water ( and the circuitry may be adapted for fresh or sea water), the water establishes a conducting path between probes 11 and 13. This turns the base of T2 negative relative to the emitter to turn on T2. When T2 turns on, the requisite negative bias is then applied to transistor T3 turning it on. Turning on T3 closes the conducting path between the positive terminal across gap 15 to switch 10.

With gap 15 closed because probes 11 and 13 are in water the next following OFF to ON transition of switch 10 will activate the circuitry as hereinafter described.

Thus with probes 11 and 13 immersed-in water, motion of the lure causes switch 10 to complete this circuit between battery 16 and pin 4, (that is the switch is changing state from OFF to ON); the (0-1) or 0 V to 3 V transition at pin 4 causes the integrated circuit to go to "set" condition causing pin 7 of IC to go to 0 volts. This causes transistor T to conduct lighting LED's 12. The set condition of IC connects pin 3 with node 18 and in a time determined by C and R1 the circuit is returned to reset condition, extinguishing LED's 12 and allowing C to recharge. The circuitry is further designed so that switch 10 must be turned OFF and ON again before the integrated circuit can again be activated to set state.

It will be appreciated that the ground shown at node 18 is instrument ground only and is unconnected to anything outside the lure. The choice of node 18 as ground is somewhat arbitrary but assists on the description of the circuit.

The use of the circuitry shown in FIG. 3 transcends the need for an "off" attitude of the lure to conserve battery power as it ensures only one brief illumination of the LED's per switch 10 closure. This allows the lure to be held or left where, due to the attitude of the lure, switch 10 is closed, without continuing illumination of the LED's and consequent battery 16 power depletion.

In summary then, the LED's are turned on by the transition of the mercury switch from OFF to ON states and remain on until turned off by the timing circuit. (If the mercury switch opens during the timed interval the circuitry will usually be designed to continue the LED on until the end of the interval), The LED's are off after the end of the timed interval until the switch again makes the transition from OFF to ON.

If a mechanical or piezotronic switch is used as an alternative to mercury switch 10 such alternative switch may contain its own bias to OFF state. However it will often still be advantageous to use the timing circuit described to extend battery life since the switch may be slow in turning OFF.

Obviously it is within the scope of the invention to use any other circuit, integrated or otherwise, designed to be motion activated and to cause the cessation of duration of the illumination of LED's 12. Circuits to control the duration are of particular importance for the reasons previously explained. (Integrated circuits are or shortly will be available which incorporate resistors R1, R2, R3 and capacitor C into the chip).

Obviously there is no limitation as to the type of lure with which the invention may be used and the lure may simply be a light, battery and switch used in association with a hook or net.

(It may be worthwhile to note that if switch 10 were, during an interval maintained in ON state, then immersion of the lure would close gap 15 and appear to the integrated circuit as an OFF to ON transition of the switch 10. Similarily removal of the lure from water with the switch 10 in ON state will look to the integrated circuit like an ON to OFF transition. However, it is extremely unlikely that switch 10 would remain ON during such changes in gap 15 and if it does occur, the delay circuit will control the duration of the LED's exactly as described for the OFF to ON switch changes, so that no disadvantages ensue and the advantages of the invention accrue).

I claim:

1. Fishing lure comprising:
    a lure body,
    at least one light source mounted on said body and designed, in conjunction with said body, to be visible, exteriorly of said body, when illuminated,
    a power source for energizing said light source, breaking a connection between said power source and said at least one light source,
    said circuit including a switch responsive to motion of said lure to alternate between OFF and ON states,
    said circuit being responsive to a transition of said switch from OFF to ON state to establish said connection between said power source and said light source,
    wherein said circuit includes timing means adapted when said body is in water to time a predetermined period after said transition and, responsive to the expiration of said period for breaking said connection.

2. Fishing lure as claimed in claim 1 including a pair of probes electrically exposed at the surface of said body,
    wherein said circuit is adapted, responsive to the presence or absence of water between said probes to allow or prevent respectively the illumination of said light source responsive to said OFF to ON transition of said switch.

3. Fishing lure as claimed in claim 1 wherein said light source is an LED.

4. Fishing lure as claimed in claim 3 including a pair of probes electrically exposed at the surface of said body,
    wherein said circuit is adapted, responsive to the presence or absence of water between said probes to allow or prevent, respectively the illumination of said light source responsive to said OFF to ON transition of said switch.

* * * * *